(12) United States Patent
Meshenky et al.

(10) Patent No.: US 7,172,016 B2
(45) Date of Patent: Feb. 6, 2007

(54) INTERNALLY MOUNTED RADIAL FLOW, HIGH PRESSURE, INTERCOOLER FOR A ROTARY COMPRESSOR MACHINE

(75) Inventors: Steven P. Meshenky, Racine, WI (US); Robert J. Barfknecht, Waterford, WI (US); B. Joseph Fietkiewicz, Racine, WI (US); LeRoy Goines, Racine, WI (US); Peter C. Kottal, Racine, WI (US)

(73) Assignee: Modine Manufacturing Company, Racine, WI (US)

(*) Notice: Subject to any disclaimer, the term of this patent is extended or adjusted under 35 U.S.C. 154(b) by 443 days.

(21) Appl. No.: 10/264,822

(22) Filed: Oct. 4, 2002

(65) Prior Publication Data

US 2004/0065433 A1  Apr. 8, 2004

(51) Int. Cl.
*F28F 9/02* (2006.01)
*F02F 1/06* (2006.01)

(52) U.S. Cl. ............ 165/173; 165/176; 165/125
(58) Field of Classification Search ........ 165/153, 165/176, 79, 125, DIG. 357, 51, 173, 175, 165/906; 123/41.69; 415/178, 177, 179, 415/180; 60/599, 39.512; 29/890.046, 890.047, 29/890.052
See application file for complete search history.

(56) References Cited

U.S. PATENT DOCUMENTS

| | | | |
|---|---|---|---|
| 1,553,093 A | | 9/1925 | Modine |
| 1,752,879 A | * | 4/1930 | Anderson ............ 165/151 |
| 1,887,036 A | | 11/1932 | Modine |
| 2,006,649 A | | 7/1935 | Modine |
| 2,022,463 A | * | 11/1935 | Erschen et al. ............ 96/371 |
| 2,055,549 A | | 9/1936 | Modine |
| 2,067,758 A | * | 1/1937 | Flogaus ............ 180/68.1 |
| 2,488,627 A | * | 11/1949 | Hisey ............ 165/151 |
| 2,650,073 A | | 8/1953 | Holm |
| 2,807,445 A | * | 9/1957 | Gardner ............ 165/173 |
| 2,983,483 A | | 5/1961 | Modine |
| 3,211,362 A | * | 10/1965 | Laskey et al. ............ 417/407 |
| 3,245,465 A | * | 4/1966 | Young ............ 165/148 |
| 3,280,899 A | * | 10/1966 | Brasie ............ 165/109.1 |
| 3,773,106 A | * | 11/1973 | Levy ............ 165/299 |
| 3,866,668 A | * | 2/1975 | Doerner ............ 165/92 |

(Continued)

FOREIGN PATENT DOCUMENTS

DE    3013317    * 11/1980

(Continued)

*Primary Examiner*—Tho Duong
(74) *Attorney, Agent, or Firm*—Wood, Phillips, Katz, Clark & Mortimer (57) ABSTRACT

A header construction intended for use in a heat exchanger (36) employed in a relatively high pressure application includes an array of generally parallel tube runs (84) with fins (82) extending between adjacent ones of the tube runs. At least one relatively flat header plate (86) has a plurality of tube slots (88) for receiving ends (90) of the tubes (84) and a tank (94) is mounted to and sealed to the header plate (86). Peripheral flanges (112) are located about tube slots (86) in the headers and a header reinforcing plate (114) is bonded to the header plate (86) oppositely of the tank (94). Stiffening beads in the form of flanges (120) are located on the header reinforcing plate (114) between openings (118) therein through which the tubes (84) pass and extend away from the header plate (86).

16 Claims, 5 Drawing Sheets

U.S. PATENT DOCUMENTS

| | | | |
|---|---|---|---|
| 4,062,401 A | | 12/1977 | Rudny et al. |
| 4,428,419 A | | 1/1984 | Dubrovsky et al. |
| 4,473,034 A | * | 9/1984 | Raudabaugh et al. ...... 122/18.4 |
| 4,546,822 A | * | 10/1985 | Tamura ...................... 165/149 |
| 4,550,775 A | | 11/1985 | Edwards et al. |
| 4,625,793 A | * | 12/1986 | Cadars ........................ 165/151 |
| 4,706,736 A | | 11/1987 | Gyori |
| 5,000,258 A | | 3/1991 | Negishi |
| 5,042,576 A | | 8/1991 | Broadbent |
| 5,056,594 A | | 10/1991 | Kraay |
| 5,067,235 A | * | 11/1991 | Kato et al. ............. 29/890.043 |
| 5,077,601 A | | 12/1991 | Hatada et al. |
| 5,078,206 A | | 1/1992 | Goetz, Jr. |
| 5,172,752 A | | 12/1992 | Goetz, Jr. |
| 5,201,367 A | | 4/1993 | Dubrovsky et al. |
| 5,303,770 A | | 4/1994 | Dierbeck |
| 5,402,656 A | | 4/1995 | Jaster et al. |
| 5,445,218 A | * | 8/1995 | Nieh .......................... 165/125 |
| 5,538,079 A | * | 7/1996 | Pawlick ...................... 165/153 |
| 5,704,211 A | | 1/1998 | Hatfield |
| 5,871,001 A | * | 2/1999 | Pelkey ........................ 123/542 |
| 5,887,649 A | | 3/1999 | Kim |
| 5,896,920 A | | 4/1999 | Jun |
| 5,927,393 A | | 7/1999 | Richter et al. |
| 6,019,160 A | | 2/2000 | Chen |
| 6,170,568 B1 | | 1/2001 | Valenzuela |
| 6,173,493 B1 | | 1/2001 | Dierbeck |
| RE37,134 E | | 4/2001 | Wilson |
| 6,374,910 B2 | | 4/2002 | Tsunoda et al. |
| 6,857,468 B2 | | 2/2005 | Emrich |

FOREIGN PATENT DOCUMENTS

| | | | |
|---|---|---|---|
| EP | 0 135 365 A2 | | 3/1985 |
| JP | 0105895 | * | 6/1985 .................. 165/79 |
| JP | 63233297 A | * | 9/1988 |
| JP | 411316092 A | * | 11/1999 |

* cited by examiner

INTERNALLY MOUNTED RADIAL FLOW, HIGH PRESSURE, INTERCOOLER FOR A ROTARY COMPRESSOR MACHINE

FIELD OF THE INVENTION

This invention relates to a heat exchanger subject to high internal pressures such as may be used as an intercooler in a rotary compressor machine such as a turbocharger or a supercharger for engines.

BACKGROUND OF THE INVENTION

Combustion air chargers, such as turbochargers or superchargers, have been employed with engines, particularly internal combustion engines, for many years. In a turbocharger, at least one rotary compressor wheel is driven by the exhaust of the engine. In the case of a supercharger, at least one rotary compressor wheel is driven mechanically, usually by the rotary output of the engine. In either case, a compressor wheel is employed to compress ambient air prior to its admission to the engine to support combustion therein. Because the air is compressed, a given volume thereof will have a greater mole content of oxygen than an otherwise equal of volume of air at ambient pressure. As a consequence, the additional oxygen permits the combustion of a greater quantity of fuel so that for a power plant of a given size, a greater power output may be derived as a result of the charging of the combustion air.

Over the years, it has been determined that the efficiency of such combustion air charging devices can be improved through the use of a so-called intercooling system. Because the air is heated as it is compressed, part of the efficiency derived by employing the combustion air charging device in the first place, i.e., the densification of the combustion air charged to the engine, is lost because a volume of hot compressed air will contain less oxygen than an equal volume of cooler compressed air when both are at the same pressure. Thus, for a given pressure, upon admission to an engine for combustion, a cooler combustion air charge will allow the development of more power within the engine than the same charge at the same pressure if at a higher temperature.

Consequently, intercoolers as mentioned previously have been employed to cool the air after it exits the combustion air charger (or a stage thereof) and prior to its admission to the engine so as to provide, for any given pressure, a maximum mole content of oxygen.

In many cases, the intercooler will be employed as a conventional, rectangular-shaped heat exchanger and is mounted side-by-side or to the front or rear of the usual heat exchanger employed for cooling engine coolant. While this sort of an arrangement adequately handles the cooling of the pressurized combustion air, it may have certain constraints in terms of size and the volume available in an engine compartment as, for example, in a vehicle, that houses both the engine and the various heat exchangers employed for cooling. It also may require extensive hose connections between the turbocharger, the intercooler and the engine combustion air inlet which necessarily require relatively large diameter hoses because of the low density of the combustion air and the consequent large volume thereof.

It has therefore been proposed to incorporate the intercooler within the combustion air charger itself to provide a more compact combustion air charging and intercooling system as well as to avoid large, bulky hose connections to the extent possible. The goal here is to incorporate the intercooling heat exchanger within the combustion air charger in such a way that it may be easily serviced, requires a minimum of plumbing connections and does not unduly increase the bulk of the combustion air charger.

Furthermore, an internally mounted intercooler is more conveniently provided with a liquid cooling heat exchange fluid, such as engine coolant, which may be at relatively high pressure. Therefore, the intercooler must be capable of withstanding such high pressures. At the same time, thermal cycling and pressure cycling can also contribute to fatigue of the heat exchanger. Thus, the heat exchanger must be fabricated to withstand high pressure and be resistant to fatigue caused by thermal and pressure cycling.

The present invention is directed toward the provision of advantageous solutions to these problems in an intercooling heat exchanger that is intended to be located internally within a rotary radial discharge compressor that may have a variety of uses as in a combustion air charger for an engine, as well as toward the provision of a pressure resistant heat exchanger generally.

SUMMARY OF THE INVENTION

It is a principal object of the invention to provide a new and improved rotary compressor machine with internal intercooling for use in providing cooled, compressed air for any of a variety of uses. It is also the object of the invention to provide an improved combustion air charging apparatus with an internal intercooler that is more compact than known such systems, can be employed in a system utilizing a liquid coolant at a high pressure, and has great resistance to fatigue caused by pressure and/or thermal cycling.

It is also a principal object of the invention to provide a new and improved heat exchanger adapted for use in applications where at least one heat exchange fluid is at high pressure. More specifically, it is an object of the invention to provide an improved, reinforced header construction for use in such a heat exchanger.

According to one facet of the invention, a rotary compressor machine is provided that includes a rotatable shaft having at least one compressor wheel thereon. A housing contains the compressor wheel and has an inlet to the compressor wheel and an outlet. A heat exchanger is disposed within the housing and is located between the compressor wheel and the outlet. The heat exchanger is donut-shaped and has axially elongated tubes extending between, and metallurgically bonded to spaced header plates. Tanks are provided to close the header plates oppositely of the tubes and fins extend between adjacent tubes. The heat exchanger has a generally cylindrical outer periphery extending between the header plates and a generally cylindrical inner periphery extending between the header plates with the tubes and fins located between the inner and outer peripheries. A first apertured cylindrical cage extends between and is metallurgically bonded to the header plates at the outer periphery and a second apertured cylindrical cage extends between and is metallurgically bonded to the header plates at the inner periphery.

The cylindrical cages assist in rigidifying the header plates and their associated tanks when subjected internally to high pressure, thereby minimizing tube-to-header joint failures and the associated thermal and pressure cycling fatigue.

In a preferred embodiment, the apertures in at least one of the cages are elongated and extend substantially between the header plates.

In a preferred embodiment, each of the header plates include a plurality of tube slots in which ends of corresponding tubes are sealingly received. Each tube slot is surrounded by a peripheral flange directed toward the tank closing the associated header plate and a header reinforcing plate is metallurgically bonded to each header plate oppositely of the associated tank and has openings through the tube ends pass to the corresponding header plate. The header reinforcing plate stiffens the header plate.

In a preferred embodiment, each header reinforcing plate has stiffening beads between the openings therein through which the tubes pass.

In a highly preferred embodiment, the stiffening beads are flanges formed along edges of the openings in the header reinforcing plates.

Preferably, the flanges extend beyond the ends of the tube slots to assure stiffening of the header plate along the entire length of the tube to header joints.

In one embodiment, each header plate defines the inner and outer peripheries and has peripheral, U-shaped grooves thereat and opening toward and receiving a corresponding edge of the first and second cages.

In one embodiment, each header reinforcing plate includes a flange-like formation about its inner and outer periphery located just inwardly of the U-shaped grooves on the associated header plate and directed toward the other of the header plates. Each flange-like formation abuts a facing edge of one of the first and second cages adjacent the associated header plate.

Preferably, the flange-like formations are metallurgically bonded to the facing edges of the cages.

In a preferred embodiment, the apertures are elongated and the number of tube constructions is an integral multiple of the number of apertures. The heat exchanger includes at least one mating formation on each of the cages and at least one of the header plates constructed to interengage to place each aperture in a predetermined relation with a corresponding one or more of the tubes.

Preferably, the mating formation includes male and female members.

In a preferred embodiment, the apertures are in spaced relation and are separated by strips extending between the edges of the first cage and the strips include deflecting sections for directing flow between the tubes and at the fins and at a predetermined direction.

According to another facet of the invention, there is provided a heat exchanger intended for use in an application wherein at least one heat exchange fluid is at a relatively high pressure. The heat exchanger includes an array of generally parallel tube runs through which at least the one heat exchange fluid may pass along with fins extending between adjacent ones of the tube runs in heat exchange relation therewith. At least one relatively flat header plate having a plurality of tube slots for receiving the ends of the tube runs is provided. A tank is sealed and mounted to header plate to define a chamber for providing to and/or receiving the one heat exchange fluid from the ends of the tube runs. Peripheral flanges on the header plate about the tube slots are provided and are directed into the tank. The ends of the tube runs are sealingly and metallurgically bonded thereto.

A header reinforcing plate is bonded to a side of the header opposite the peripheral flanges and has openings through which the tube run ends pass to the header plate and stiffening beads are provided on the header reinforcing plate between the openings and extend away from the header plate.

Preferably, the stiffening beads are flanges extending along at least one side of each of the openings.

In a preferred embodiment, the tube slots are elongated and the stiffening beads have a greater length than the tube slots and extend past the ends of the tube slots.

In a preferred embodiment, the tube runs are each defined by a single straight tube.

Other objects and advantages will become apparent from the following specification taken in connection with the accompanying drawings.

DESCRIPTION OF THE PREFERRED EMBODIMENTS

The exemplary embodiments of the invention described herein are specifically disclosed as combustion air chargers in the form of a two stage turbocharger. However, it is to be understood that this description is for exemplification purposes and no restriction to turbochargers or to the number of stages is intended. For example, the invention may be employed with efficacy in rotary compressor machines generally as well as in a single stage turbocharger and may be employed in single or multiple stage superchargers as well. Generically, turbochargers and superchargers are referred to herein as combustion air chargers and no limitation to either turbochargers or to superchargers is intended except insofar as expressly stated in the appended claims. Further, the pressure resistant header construction and its relation to the tank and tubes as disclosed herein is not to be limited to rotary compressor machines except to the extent expressly stated in the appended claims. It can be employed with efficacy in a variety of heat exchanger constructions wherein tubes are sealingly received and metallurgically bonded in tube slots in a header plate which in turn is closed with a tank and where resistance to relatively high pressures is required in the application for which the heat exchanger is intended. With the foregoing in mind, attention is directed to FIG. 1.

Figure 1:
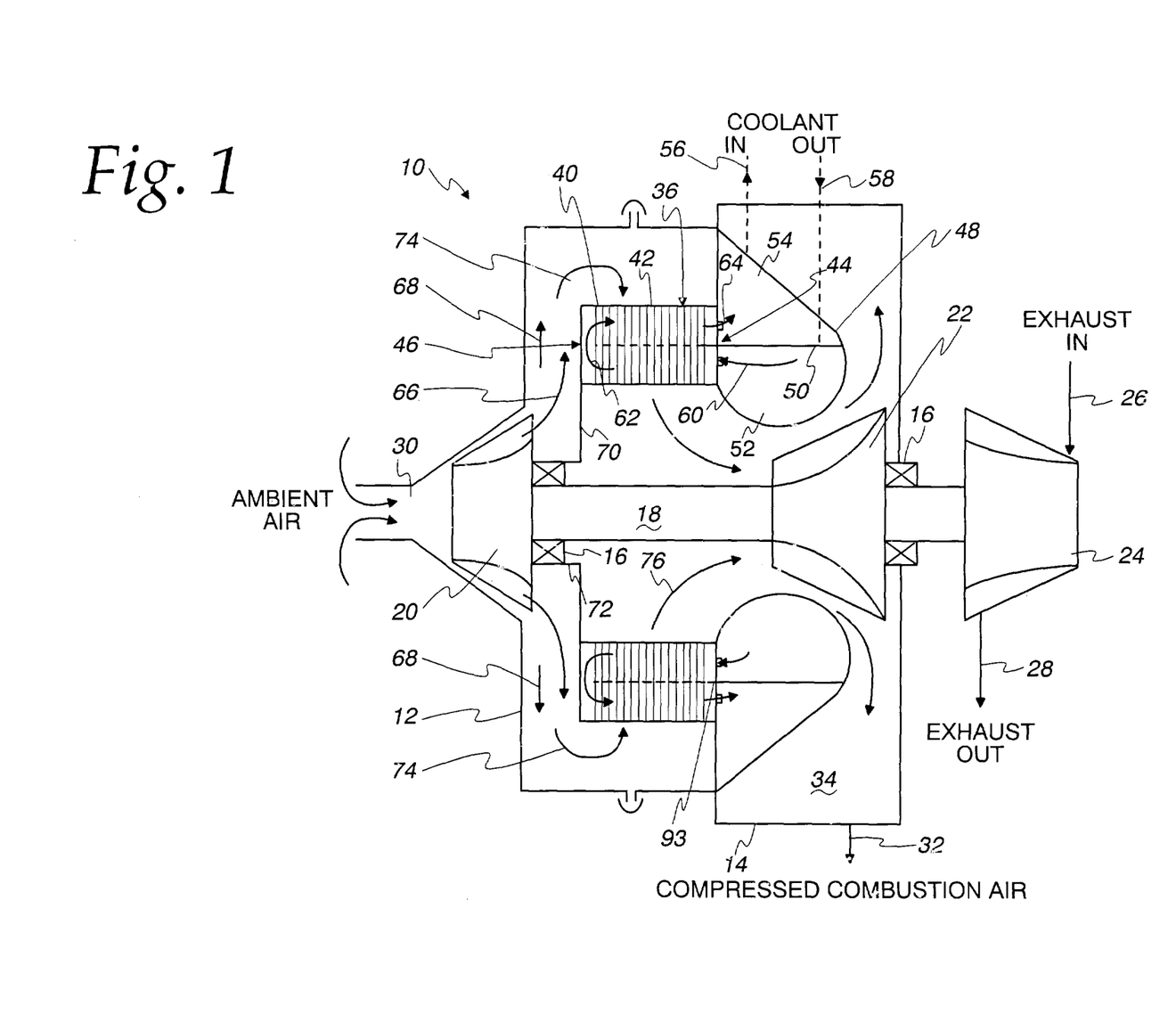
FIG. 1 is a somewhat schematic, sectional view of a rotary compressor machine in the form of a combustion air charger made according to the invention.

An exemplary embodiment of the invention is seen to include a housing, generally designated 10, formed of at least two separable sections, 12 and 14 respectively. Journalled within the housing 10 by any suitable bearings (not shown) is a rotary shaft 18. In the illustrated embodiment, the rotary shaft mounts a first compressor wheel 20, a second compressor wheel 22 and turbine wheel 24 which, in turn, will be located within a housing (not shown). As indicated by an arrow 26, the turbine wheel 24 is driven by the exhaust from an internal combustion engine to drive the shaft 18. Spent exhaust is outletted from the turbine wheel 24 as indicated by arrow 28.

The housing 12 includes an ambient air inlet 30 while the housing 14 includes a compressed air outlet, schematically indicated by an arrow 32. The inlet 30 is to the inlet side of the compressor wheel 20 while the outlet 32 is from a volute, schematically illustrated at 34, on the outlet side of the compressor wheel 22.

A heat exchanger made according to the invention, generally designated 36, is contained within the housings 12,14 where the two are joined together as indicated schematically by removable fasteners 38. The heat exchanger 36 is donut-shaped or ring-shaped and includes a radially outer cylindrical surface 40 which defines an air inlet for the passage of air through the heat exchanger 36. A radially inner cylindrical surface 42 forms an air outlet for the heat exchanger 36.

The sides of the heat exchanger are provided with a first inlet/outlet header and tank, generally designated 44, on the side of the heat exchanger 36 located within the housing 14 and a redirecting header and tank, generally designated 46, on the side of the heat exchanger 36 within the housing 12. A coolant manifold 48 is located within the housing 14 to one side of the volute 34 and radially inward of the radially outer part of the volute 34. The manifold 48 is divided by an internal web or baffle 50 into a radially inner manifold section 52 and a radially outer manifold section 54. The system is provided with a coolant inlet schematically illustrated by an arrow 56 which extends to radially inner manifold section 52 and a coolant outlet schematically illustrated by an arrow 58 which extends to the radially outer manifold section 54. By a construction to be described in greater detail hereinafter, a coolant, such as coolant for the internal combustion engine, enters the turbocharger through the inlet 56 and is passed to the radially inner manifold section from which it flows into the inlet/outlet header and tank 44 at a radially inner part thereof to flow axially through the heat exchanger 36 to the reentrant header and tank 46 where its direction is reversed to flow through the radially outer part of the heat exchanger 36 back to the inlet/outlet header and tank 44. From the header and tank 44, the coolant is discharged into the radially outer manifold section 54 to the coolant outlet 58. This flow of coolant is indicated by a series of arrows 60, 62 and 64.

Air flow through the turbocharger is as follows. Ambient air enters in the inlet 30 and passes to the inlet side of the compressor wheel 20. As the compressor wheel 20 is driven by the turbine wheel 24, the air is compressed and discharged at an elevated pressure on the radially outer periphery of the compressor wheel 20 as indicated by arrows 66. The compressed air continues to flow radially outwardly through an annular space 68 between the housing 12 and the heat exchanger 36 which is in part defined by the reentrant header and tank 46, a radial baffle 70 extending radially inwardly from the reentrant header and tank 46 and an axial baffle 72 which extends from the baffle 70 at its radially innermost part to mount on a part of the housing 12 (not shown) that mounts the leftmost bearings 16 in adjacency to the turbine wheel 20.

The radially outer side or periphery 40 of the heat exchanger 36 is spaced radially inwardly from the housings 12 and 14 allowing the air compressed by the compressor wheel 20 to be redirected as indicated by arrows 74 to enter the heat exchanger 36 at the radially outer periphery 40 thereof. The air then passes through the heat exchanger 36 in a radially inward direction and is cooled by the coolant that flows axially through the heat exchanger 36 as mentioned earlier. The cooled, compressed air is then discharged from the heat exchanger 36 as indicated by arrows 76 to the inlet side of the compressor wheel 22 whereat it is further compressed and then discharged into the volute 34 as indicated by arrows 78. This compressed air is then discharged as compressed combustion air to the internal engine to support combustion therein. If desired, additional cooling stages could be included between the compressor wheel 22 and the engine. Alternatively, as mentioned previously, in a single stage turbocharger, the compressor wheel 22 can be omitted in which case the air being discharged from the radially inner side of periphery 42 of the heat exchanger 36 could be discharged directly into the volute 34.

Significant features of the invention as thus far described include the following. Flow of the compressed air through the heat exchanger 36 is from the radially outer to the radially inner periphery. Thus, the compressed air at elevated temperature discharges from the compressor 20 toward a relatively large volume area radially outward of the heat exchanger 36. As the compressed air is cooled within the heat exchanger 36, it becomes more dense and its volume is reduced to a lesser volume area as it flows within the heat exchanger. This feature of the invention allows the air velocity to be maintained as it passes through the heat exchanger 36 to increase heat exchanger efficiency without unduly increasing pressure drop. It will be appreciated that if the air flow was between two areas of equal volume with the heat exchanger 36 interposed therebetween, the velocity of the air flow through the heat exchanger 36 would progressively decrease as the compressed air was cooled, thereby lowering the efficiency of the heat exchanger.

A second feature of the invention includes the fact that the radially inner periphery 42 of the heat exchanger has a larger diameter than the outer diameter of the turbine wheel 20 as seen in FIG. 1. Thus, by removing the fasteners (not show) and separating the housing 12 from the housing 14, the heat exchanger 36 may be slipped axially to the left as viewed in FIG. 1 and about the turbine wheel 20 for servicing. That is to say, the turbine wheel 20 does not require removal from the shaft 18 to allow removal of the heat exchanger 36.

It will also be appreciated that much of the plumbing for both air and coolant is contained within the turbocharger itself, providing a compact assembly and minimizing piping losses. For example, large diameter, external hoses connecting the compressor to an external heat exchanger are completely avoided.

Except to the extent modified by the invention disclosed and claimed herein, the construction of the components is described in greater detail in the copending, commonly assigned application of Meshenky et al entitled "Internally Mounted Radial Flow Intercooler for a Combustion Air Charger", filed Sep. 20, 2002, Ser. No. 10/251,537, the entire disclosure of which is herein incorporated by reference.

Figure 2:
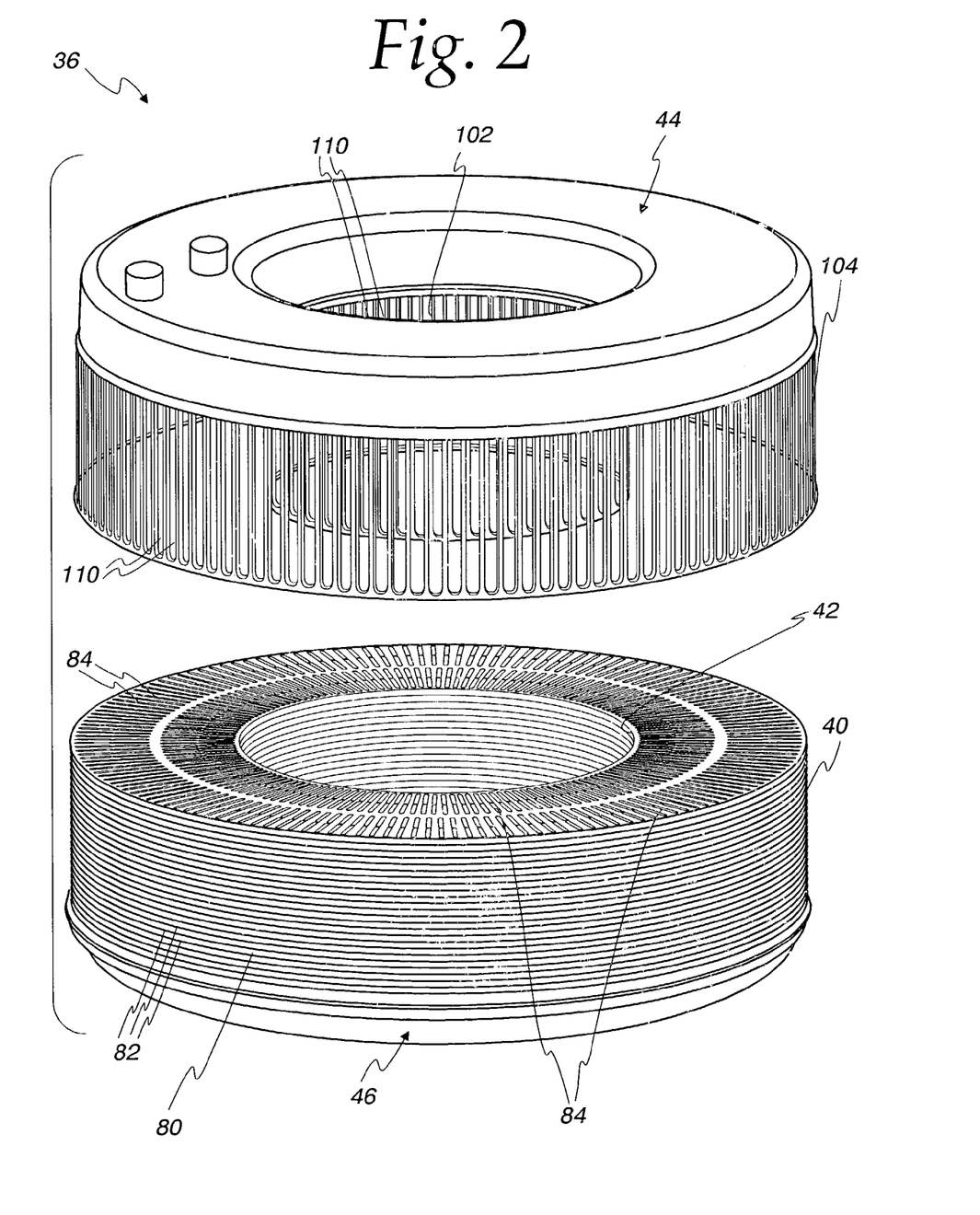
FIG. 2 is an exploded view of the heat exchanger employed in the combustion air charger.
Figure 3:
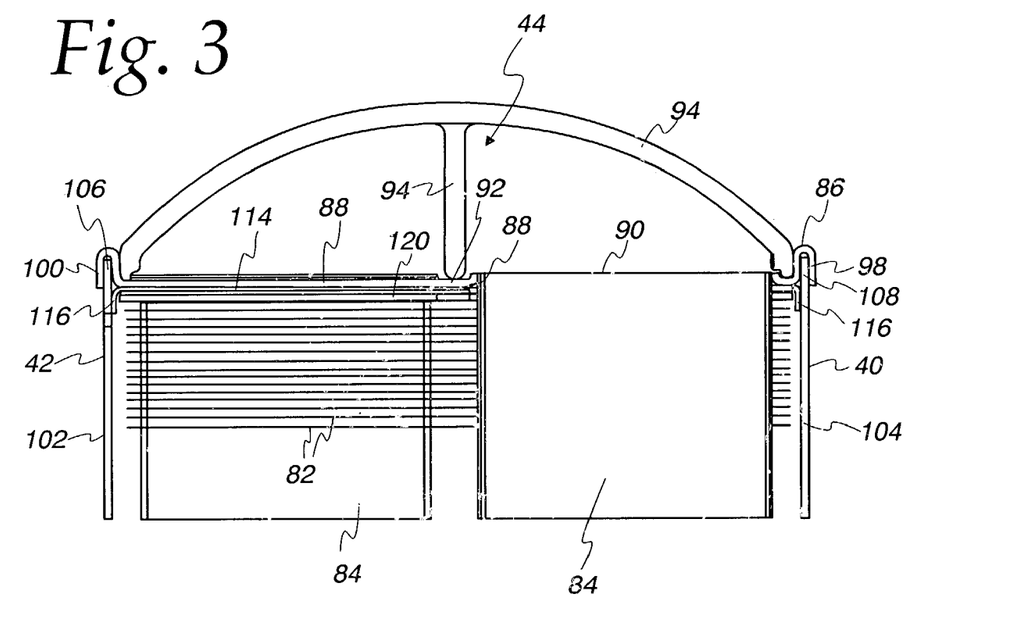
FIG. 3 is a fragmentary, sectional view of one end of the heat exchanger.

Turning now to FIGS. 2–6, inclusive, the heat exchanger 36 will be described in greater detail. As seen in FIG. 2, the same has a generally cylindrical core 80 defining the inner and outer peripheries 42 and 40, respectively. The core 80 includes a plurality of plate fins 82 (serpentine fins could be used as well) of ring-like shape which include tube slots, not shown, for the receipt of flattened or wedge-shaped tubes 84. As seen in the center part of FIG. 2, the tubes 84 are in radially inner and outer rows, with the tubes 84 in one row being staggered with respect to the tubes 84 in the other row. As seen in FIG. 3, the header and tank 44 includes two annular, circular headers 86 (only one of which is shown) including tube slots 88 which are in the rows as illustrated in FIG. 2 and which receive the ends 90 of the tubes 84. The tube ends 90 are metallurgically bonded and sealed within the tube slots 88 as by brazing. The headers 86 define the outer inner peripheries 40 and 42, respectively and generally centrally thereof, a ring-like imperforate surface 92 is provided against which a baffle 93 (FIG. 1) fitted to a tank 95 forming part of the header and tank 44 abuts.

Both headers 86, at both their inner and outer peripheries 42 and 40, respectively, include a U-shaped formation 98 and 100, respectively, which receive annular inner and outer cages 102 and 104, respectively. The cages 102,104 may each be made in a single unitary piece or of multiple circular segments. It is preferable that the cages 102,104 have different coefficients of thermal expansion so that the inner cage 102 expands the same amount as the outer cage 104 to avoid thermal stress caused by any temperature differential between the cages 102,104. The U-shaped formations 98 and 100 receive the edges 106,108 of the cages 102,104 and are bonded thereto, as by brazing.

Figure 4:
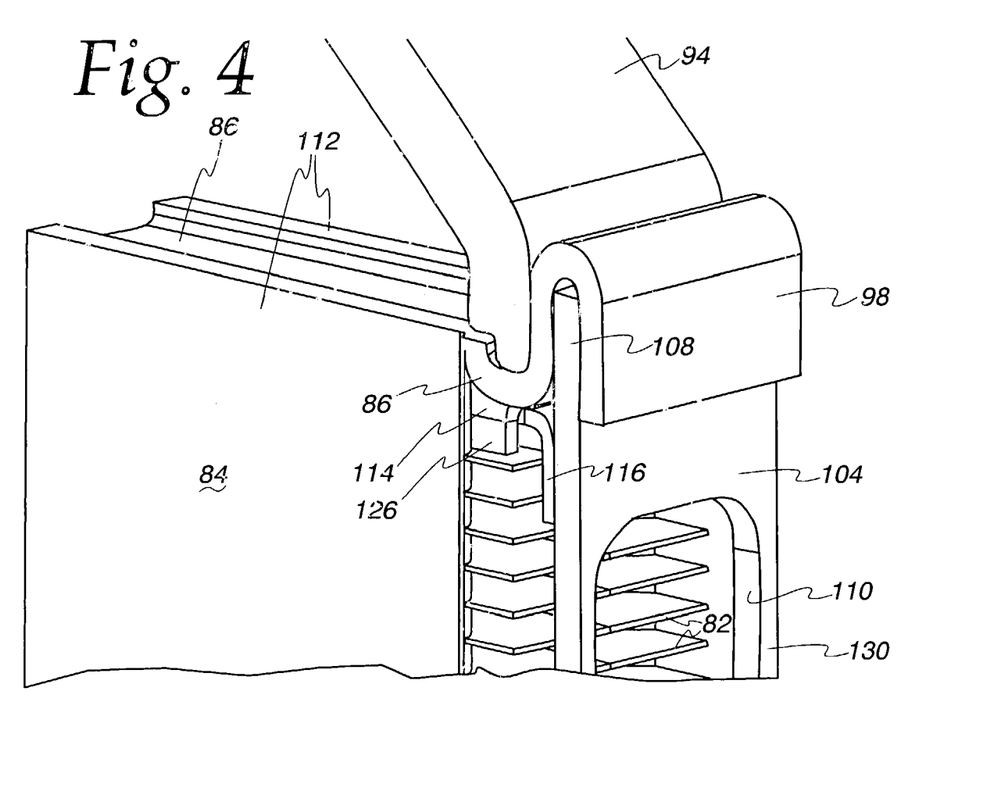
FIG. 4 is a fragmentary, enlarged, perspective view of a peripheral joint forming part of the heat exchanger.
Figure 5:
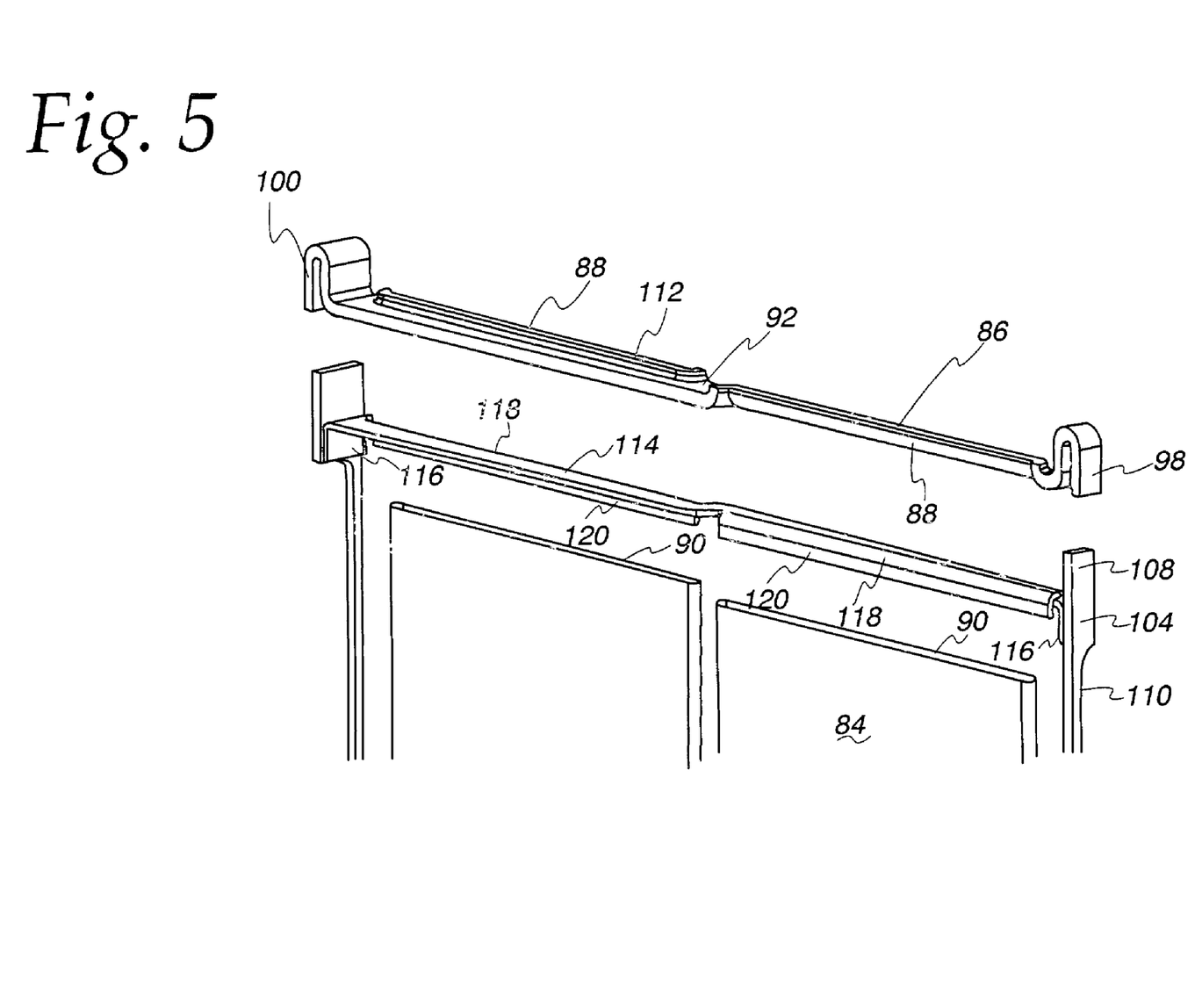
FIG. 5 is an exploded, perspective view of components of the heat exchanger.

The header and tank 46 may be formed generally identically to the header and tank 44 except that the baffle 93 is omitted. The cages 102,104 are similarly received and sealingly metallurgically bonded in U-shaped formations at the inner and outer periphery like the U-shaped formations 98 and 100 of the header and tank 46. As alluded to previously, the inner and outer cages 102 and 104 are apertured and each includes a series of elongated apertures 110 which extend between and almost to the two header plates. As seen in FIGS. 3–5, the tube slots 88 are surrounded by peripheral flanges 112 which are directed into the respective one of the tanks such as the tank 94 which bondingly receive the tube ends 90 as mentioned previously.

In the embodiment illustrated, the tubes 84 define straight tube runs, each composed of an individual tube. However, in some instances, the header and tank 46 may be omitted and U-shaped, elongated tubes, each defining two runs may have ends 90 received in the tube slots 88 of the inlet/outlet header and tank 44.

As best seen in FIGS. 3–5 inclusive, both header plates 86 (only one shown) are reinforced by a header reinforcing plate 114 metallurgically bonded as by brazing to the side of the header plate 86 that is remote from the tank 94. However, the reinforcing plate 114 can be on the tank side of the header plate 86 if desired. At its outermost periphery, the header reinforcing plate 114 includes a flange-like formation 116 which extends away from the tank 94 and which is located just inwardly of the U-shaped formations 98,100 so as to abut the inner edge 106,108 of the cages 102,104 and to be metallurgically bonded thereto. The flanges 116 may be interrupted or may be continuous as the case may be. It is of some significance that they do not extend downwardly to cover any part of the apertures 110 in the cages 102,104, thereby promoting good air flow through the heat exchanger core.

The header reinforcing plates 114 are provided with a plurality of elongated openings 118 through which the tubes 84 pass to the header plate 86. The openings 118 have flanges 120 along both of the elongated sides thereof which serve as stiffening beads to add additional stiffness to the header reinforcing plate 114, and thus to the header 86. The flanges 118 may be located on both sides of the associated opening 114 and may be spaced from the walls of the tubes 84 so as to allow easy insertion of the tubes 84 into the tube slots 88. Thus, the flanges 120 are located between each of the openings 118 through which the tubes 84 pass.

It will be noted that the flanges 120 are preferably longer than the adjacent tube slots 88 and thus will extend beyond the ends of the tubes 84 as seen in the left-hand part of FIG. 3. This provides for stiffening of the header plate 86 across the entire area in which a tube is received to minimize flexing thereat. Such flexing can be caused by the pressure of the fluid received within the tank 94 adjacent the relatively flat header 86, which tends to cause the latter to "go round". Thus, fatigue of the tube-to-header joints caused by high pressure, thermal cycling or pressure cycling is greatly resisted.

Figure 6:
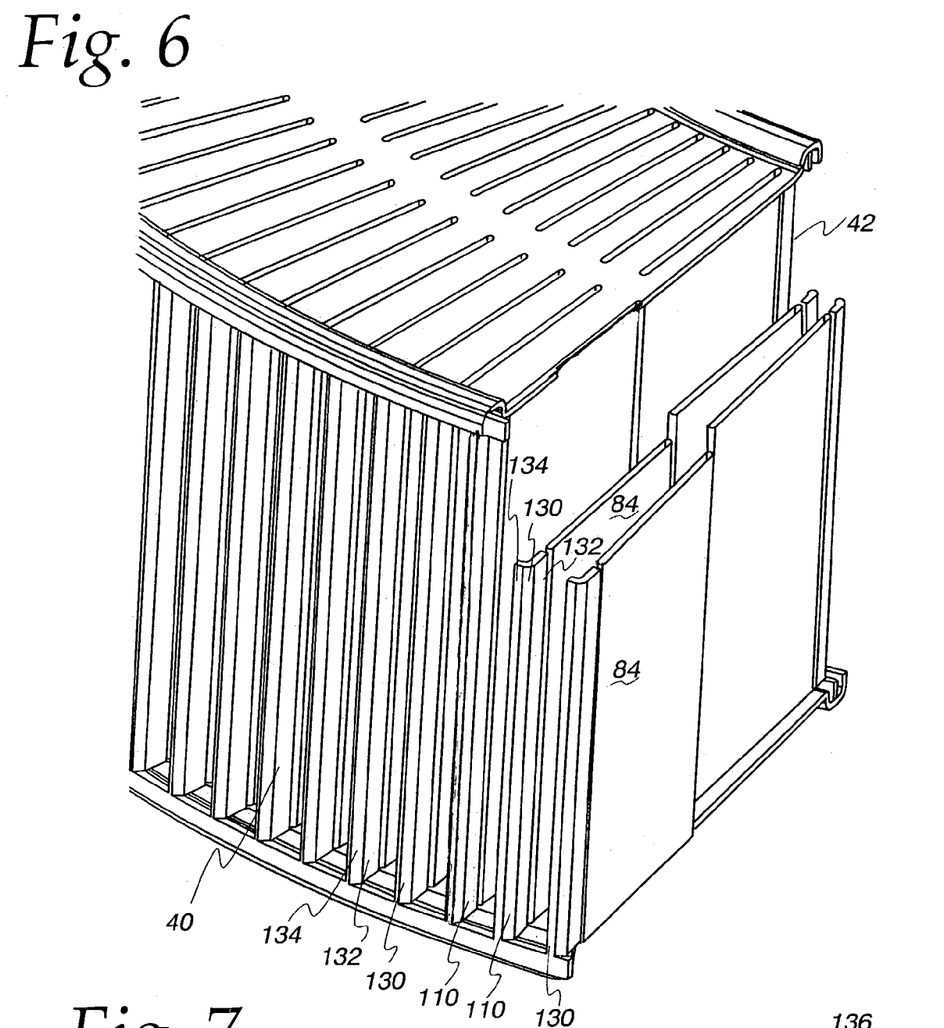
FIG. 6 is a fragmentary, perspective view of part of heat exchanger with components broken away for clarity.

Returning to the cages 102,104, it will be seen in FIG. 6 that the apertures 110 are separated by imperforate strips 130 and according to the invention, the number of tubes 84 in both rows will be an integral multiple of the number of openings 110 in the adjacent one of the cages 102,104. In the usual case, the multiple factor will be 1 but it could greater, i.e., 2 or 3 or more if desired. To minimize pressure drop, the strips 130 are aligned with the tubes 84 in the row to which they are adjacent. The strips 130 at the outer periphery 44 are provided with a vane section 132 which may be bent with respect to the remainder 134 of each strip 130 to provide a desired air flow. The strips are preferably configured to direct flow between the tubes and at the fins in a predetermined direction. This may be done at the inner periphery 42 if desired but usually is not necessary. The vane sections 132 may be oriented to as to cause air flow to enter the core adjacent the ends or minor dimensions of the tubes 84 in a desired path.

Figure 7:
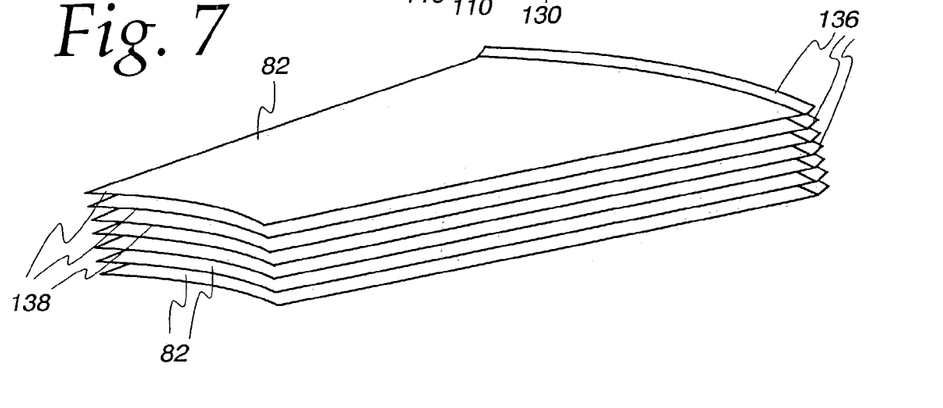
FIG. 7 is a fragmentary, perspective view of plate fins that may be used in the heat exchanger.

FIG. 7 shows a series of the plate fins 82 provided with bent, radially outer edges 136 to provide additional flow directing vanes. If desired to attain a particular flow direction, the inner edges 138 could similarly be bent to form flow directing vanes.

Other advantages will be apparent to those skilled in the art from the foregoing description which is intended to be exemplary and not limiting.

The invention claimed is:

1. A rotary compressor machine comprising:
    a rotatable shaft having at least one compressor wheel thereon;
    a housing containing at least said one compressor wheel and having an inlet to said compressor wheel and an outlet; and
    a heat exchanger within said housing and located between said compressor wheel and said outlet, said heat exchanger being donut-shaped and having axially elongated tube constructions extending between and metallurgically bonded to spaced header plates, tanks closing said header plates oppositely of said tube constructions, and fins extending between adjacent tube constructions, said heat exchanger having a generally cylindrical outer periphery extending between said header plates and a generally cylindrical inner periphery extending between said header plates with said tube constructions and fins located between said inner and outer peripheries, a first apertured cylindrical cage extending between and metallurgically bonded to said header plates at said outer periphery and a second apertured cylindrical cage extending between and metallurgically bonded to said header plates at said inner periphery.

2. The rotary compressor machine of claim 1 wherein the apertures in at least one of said cages are elongated and extend substantially between said header plates.

3. The rotary compressor machine of claim 1 wherein said tube constructions are tubes and each of said header plates include a plurality of tube slots in which ends of corresponding tubes are sealing received, each tube slot being surrounded by a peripheral flange directed toward the tank closing the associated header plate, and a header reinforcing plate metallurgically bonded to each header plate and having openings aligned with the tube slots in the corresponding header plate.

4. The rotary compressor machine of claim 3 wherein each header reinforcing plate has stiffening beads between the openings therein.

5. The rotary compressor machine of claim 4 wherein said stiffening beads are flanges formed along edges of the openings in said header reinforcing plates.

6. The rotary compressor machine of claim 5 wherein said flanges extend beyond the ends of said tube slots.

7. The rotary compressor machine of claim 3 wherein each said header plate defines said inner and outer peripheries and has a peripheral, generally U-shaped groove opening toward and receiving a corresponding edge of said first and second cages.

8. The rotary compressor machine of claim 7 wherein each said header reinforcing plate includes flange-like formation about its inner and outer periphery located just radially inward of said U-shaped grooves on the associated header plate and directed toward the other of said header plates, each said flange-like formation abutting a facing edge of one of said first and second cages adjacent the associated header plate.

9. The rotary compressor machine of claim 8 wherein said flange-like formations are metallurgically bonded to said facing edges.

10. The rotary compressor machine of claim 1 wherein said apertures are elongated and the number of said tube constructions is an integral multiple of the number of apertures and further including at least one mating formation on each of said cages and at least one of said header plates constructed to interengage to place each aperture in a predetermined relation with a corresponding one or more of the tubes.

11. The rotary compressor machine of claim 10 wherein said mating formation includes male and female members.

12. The rotary compressor machine of claim 10 wherein said apertures are in spaced relation and are separated by strips extending between the edges of said first cage and said strips include deflecting sections for directing fluid flow between said tubes and at said fins in a predetermined direction.

13. The rotary compressor machine of claim 1 wherein said fins are donut-shaped plate fins, each of said plate fins having at least one of a bent, radially outer edge and a bent, radially inner edge.

14. In a heat exchanger intended for use in an application wherein at least one heat exchange fluid is at a relatively high pressure, the combination of:
an array of generally parallel tube runs through which said at least one heat exchange fluid may pass;
fins extending between adjacent ones of said tube runs in heat exchange relation therewith;
at least one relatively flat header plate having a plurality of tube slots for receiving ends of said tube runs;
a tank sealed and mounted to said header plate to define a chamber for providing to and/or receiving from the ends of the tube runs said at least one heat exchange fluid; peripheral flanges on said header plate about said tube slots and directed into said tank and to which said ends of tube runs are sealingly bonded;
a header reinforcing plate bonded to a side of said header plate opposite said peripheral flanges and having openings aligned with the tube slots in the header plate; and
stiffening beads on said header reinforcing plate between said openings and extending away from said header plate;
wherein said tank, said header plate and said header reinforcing plate are ring-like, each having a circular periphery and a central opening and said tube runs are in an annular row located between said circular periphery and said central opening.

15. The heat exchanger of claim 14 wherein said fins are donut-shaped plate fins, each of said plate fins having at least one of a bent, radially outer edge and a bent, radially inner edge.

16. A rotary compressor machine comprising:
a rotatable shaft having at least one compressor wheel thereon;
a housing containing at least said one compressor wheel and having an inlet to said compressor wheel and an outlet; and
a heat exchanger within said housing and located between said compressor wheel and said outlet, said heat exchanger being donut-shaped and having axially elongated tube constructions extending between and metallurgically bonded to spaced header plates, tanks closing said header plates oppositely of said tube constructions, donut-shaped plate fins extending between adjacent tube constructions, each of said plate fins having at least one of a bent radially outer edge and a bent, radially inner edge, said heat exchanger further including a first apertured cylindrical cage extending between and metallurgically bonded to said header plates at an outer periphery of said heat exchanger and a second apertured cylindrical cage extending between and metallurgically bonded to said header plates at an inner periphery of said heat exchanger.

* * * * *